(12) United States Patent
Avila

(10) Patent No.: US 6,742,384 B2
(45) Date of Patent: Jun. 1, 2004

(54) TRACE GAS MANAGEMENT SYSTEM FOR LEAK DETECTION OPERATIONS

(75) Inventor: Luis F. Avila, Manlius, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/189,116

(22) Filed: Jul. 2, 2002

(65) Prior Publication Data

US 2004/0003653 A1 Jan. 8, 2004

(51) Int. Cl.[7] .................................................. G01M 3/04
(52) U.S. Cl. ........................................ 73/40.7; 73/49.3
(58) Field of Search ........................ 73/40, 40.7, 49.2, 73/49.3

(56) References Cited

U.S. PATENT DOCUMENTS

| | | | | |
|---|---|---|---|---|
| 3,364,729 A | * | 1/1968 | Yearwood | 73/40.7 |
| 3,572,096 A | * | 3/1971 | Meyer | 73/40.7 |
| 3,729,983 A | * | 5/1973 | Coppens | 73/40.7 |
| 3,813,923 A | * | 6/1974 | Pendleton | 73/40.7 |
| 5,390,533 A | * | 2/1995 | Schulte et al. | 73/40.7 |
| 6,119,507 A | * | 9/2000 | Flosbach et al. | 73/40.7 |
| 6,196,056 B1 | * | 3/2001 | Ewing et al. | 73/40.7 |
| 6,314,794 B1 | * | 11/2001 | Seigeot | 73/40.7 |

FOREIGN PATENT DOCUMENTS

| | | | | |
|---|---|---|---|---|
| JP | 58-85129 | * | 5/1983 | 73/40.7 |
| JP | 58-147628 | * | 9/1983 | 73/40.7 |
| JP | 62-36528 | * | 2/1987 | 73/40.7 |
| JP | 1-227037 | * | 9/1989 | 73/40.7 |
| RU | 1619085 | * | 1/1991 | 73/40.7 |
| RU | 1670450 | * | 8/1991 | 73/40.7 |
| RU | 1717982 | * | 3/1992 | 73/40.7 |

* cited by examiner

Primary Examiner—Daniel S. Larkin
(74) Attorney, Agent, or Firm—Wall Marjama & Bilinski LLP

(57) ABSTRACT

The loss of trace gas to the atmosphere when leak testing heat exchangers is avoided by the use of internal and external containers, with both the trace gas sensor and the coil to be tested being placed within the internal container. The space between the two containers is preferably placed under a vacuum, and the inner and outer containers are fluidly connected to a refrigerant recovery vessel for the accumulation of leaked trace gas. The trace gas can then be returned to the charging system for reuse. The use of extractors can also be made to conduct the flow of leaked trace gas from the containers to the refrigerant recovery vessel. A containment that is also provides to receive and contain any contaminated refrigerant from the two containers.

16 Claims, 3 Drawing Sheets

TRACE GAS MANAGEMENT SYSTEM FOR LEAK DETECTION OPERATIONS

BACKGROUND OF THE INVENTION

This invention relates generally to heat exchangers for air conditioning systems and, more particularly, to a method and apparatus for leak testing of heat exchangers to be charged with refrigerant.

In the manufacture of air conditioning systems of the type installed for residential use, for example, a heat exchanger coil is used in both the indoor and outdoor units. When installed, the refrigeration circuit is charged with refrigerant, and it is important that this charge be maintained for prolonged periods of time. That is, any significant leakages that may occur will cause inefficient and ineffective operation, thereby requiring a service call for recharging and possibly repair of a leaky coil.

Because of the number of tubes involved, and the significant number of steps involved in the process of fabricating a heat exchanger, the most likely place for a leak to occur in an air conditioning system, is in a heat exchanger. Accordingly, it is important, for quality control purposes, that a relatively high percentage of heat exchangers coming off the production line be leak tested.

One known method of leak testing of heat exchangers is to pressurize the heat exchanger with a trace gas which, if there are any significant leaks in the heat exchanger, can be detected and located with the use of an appropriate sensing device. This process is usually applied to the individual heat exchangers prior to their being incorporated into the system so that any leaks can be corrected relatively easily. However, in the case of room air conditioners, for example, it may be desirable to wait until the system is assembled such that the unit may be charged as a unit, tested, and then shipped in the charged condition.

One type of trace gas that may be used for leak testing is the refrigerant itself, particularly where the system is precharged and tested as described hereinabove. Another common approach is to use a stable inert gas, such as helium, in combination with a helium detector. In order to reduce costs and facilitate the flushing process, the helium gas may be diluted with another inert gas, such as nitrogen or air, while still being detectable by the detection device.

Another type of gas that is becoming more commonly used is hexafluosulfide ($SF_6$). While this gas is more stable and also more sensitive to the detectors such that less gas is needed during the testing process, any leakage to the atmosphere is a greater problem for global warming because its stability prevents it from breaking down.

With any of the above approaches, the leakage of the trace gas can be a problem in two respects. First, any leakage of the gas into the atmosphere is environmentally undesirable, particularly with higher standards being required in the marketplace. Secondly, the loss of the trace gas becomes a cost factor if it is wasted and not re-used.

It is therefore an object of the present invention to provide an improved method and apparatus for leak testing of heat exchanger coils.

Another object of the present invention is the provision for a leak testing method which reduces the occurrence of introducing trace gases to the environment.

Yet another object of the present invention is the provision for reducing the waste that results from loss of trace gases during leak testing.

Still another object of the present invention is the provision for a heat exchanger leak testing process that is efficient and effective in use.

These objects and other features and advantages become more readily apparent upon reference to the following description when taken in conjunction with the appended drawings.

SUMMARY OF THE INVENTION

Briefly, in accordance with one aspect of the invention, an outer leak free container is provided around an inner leak free container, with the inner container having the trace gas sensing system disposed therein. A heat exchanger to be tested is installed in the inner container, which is then closed. A vacuum is drawn on the space between the two containers. The heat exchanger is pressurized with a trace gas and the detector is activated to sense and locate any inner leak in the heat exchanger. Any trace gas leakage is contained within the two containers.

By another aspect of the invention, the inner container is fluidly connected to a recovery system, which in turn is fluidly connected to the charging system, such that any leaked trace gas can be returned to the system.

In accordance with another aspect of the invention, one or more extractors are provided to cause any leaked trace gas to pass from the internal container to the recovery system.

In accordance with yet another aspect of the invention, the outer container under vacuum serves as a backup container from an escape of gas from the inner container to guarantee a zero emission testing system and thus make the system environmentally friendly.

In the drawings as hereinafter described, a preferred embodiment is depicted; however various other modifications and alternate constructions can be made thereto without departing from the true spirt and scope of the invention.

DESCRIPTION OF THE PREFERRED EMBODIMENT

Figure 1:
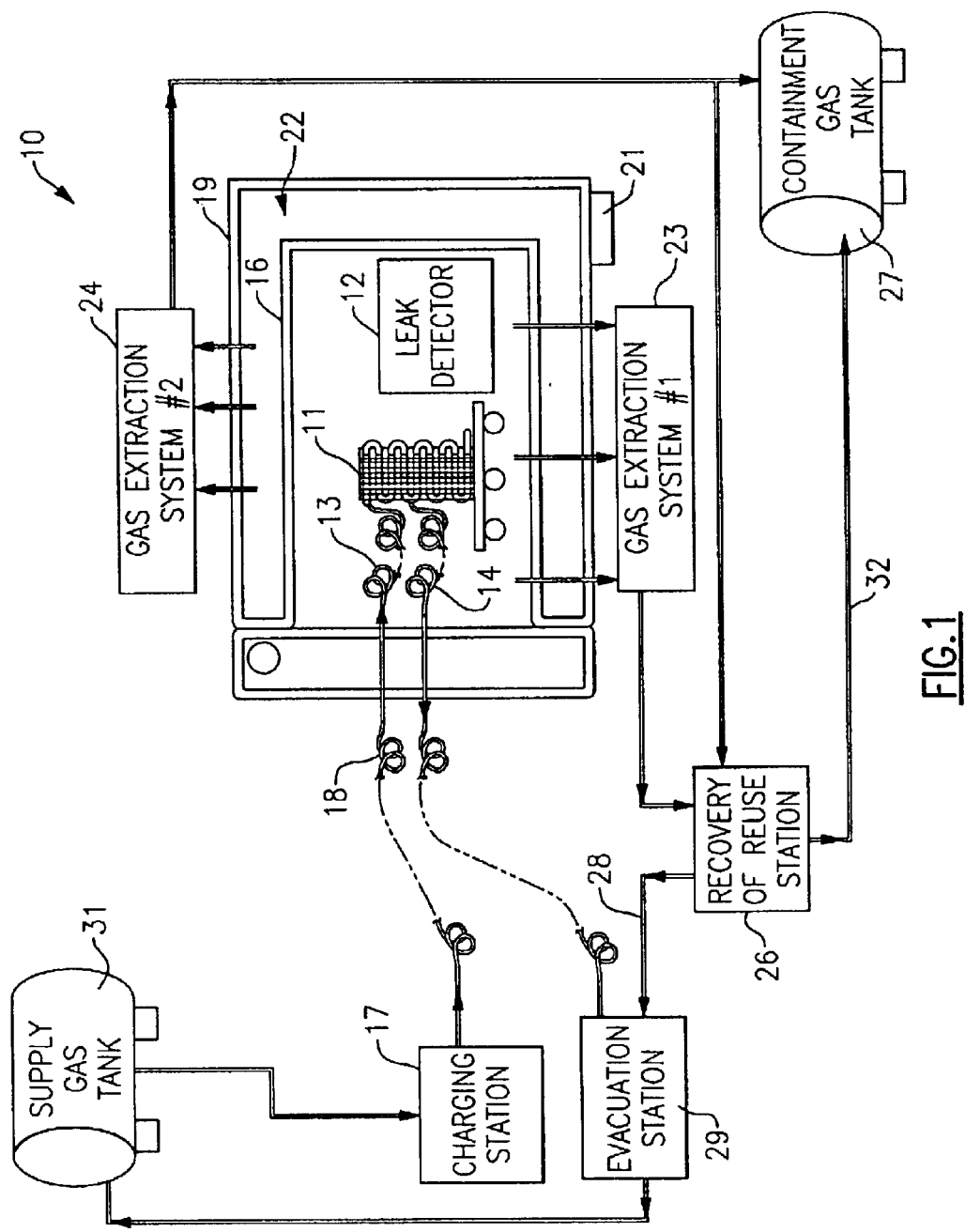
FIG. 1 is a schematic illustration of the testing apparatus and method during testing in accordance with a preferred embodiment of the present invention.

Referring now to FIG. 1, the invention is shown at 10 as applied to a heat transfer coil 11 that is to be leak tested with a leak detector sensor 12.

The coil 11, with its supply and return lines 13 and 14 for charging the coil 11 with a trace gas, is installed in an inside container or testing booth 16, along with the leak detector sensor 12. The trace gas is supplied from a charging station 17 by way of a valve and flexible hose 18 to the coil 11. The trace gas can be of any well known types that are used for this purpose such as a refrigerant, helium, or hexafluosulfide (SF6). The leak detector sensor 12 is designed to accommodate the particular trace gas which is selected. For example, if a laser detector is used, then helium would not be an appropriate trace gas to be used, and the SF6 would be a preferred trace gas for use.

Disposed in surrounding relationship to the inside container 16 is an outside container 19 which is substantially air tight. One or more vacuum pumps 21 are associated with the outside container 19 such that when the vacuum pumps 21 are actuated, a vacuum is created in the space 22 between the inside container 16 and the outside container 19. The inside container 16, is designed to operate at ambient pressure, whereas the space 22 outside thereof is maintained at a vacuum during the testing process in order to prevent the further escape to the atmosphere of any gas which leaks outside the testing booth 16.

Associated with the testing booth 16 is a gas extraction system 23 comprising one or more pumps which are provided for the purpose of removing any leaked trace gases from the inside container 16 after the testing has occurred. Similarly a second gas extraction system 24 is provided to remove any leaked trace gas from the space 22.

Whether the trace gas is in the inner container 16 or the outer container 19, any leaked trace gas is either recovered by the recovery station vessel 26 or it is passed to the containment tank 27. The recovered refrigerant gas is caused to flow, by a pump or the like, from the recovery station 26 along line 28 through the evacuation station 29 to a gas supply tank 31 and hence to the charging station 17 to be reused. At the recovery station 26, a sorting process will occur wherein most of the trace gas, which is not contaminated, will be passed along line 28 to the supply gas tank 31 to the charging system 17 to be reused. That trace gas which is found to have been contaminated, will be passed along line 32 to the containment gas tank 27. From there it may be bottled and kept separate from the charging system 17 or it may be refurbished by a filter or the like.

Figure 2:
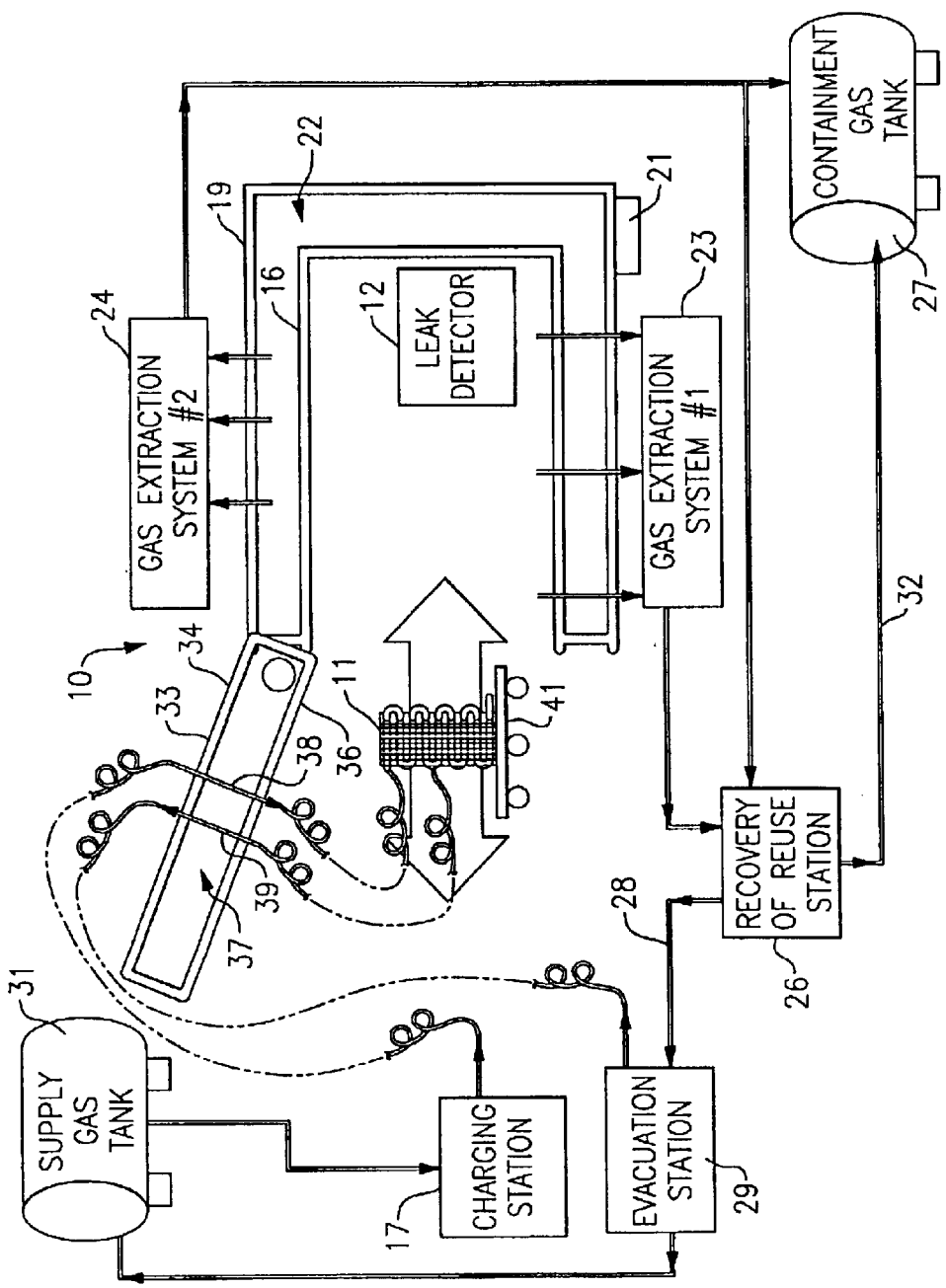
FIG. 2 is a schematic illustration of the testing apparatus and method in the set-up stage in accordance with a preferred embodiment of the invention.
Figure 3:
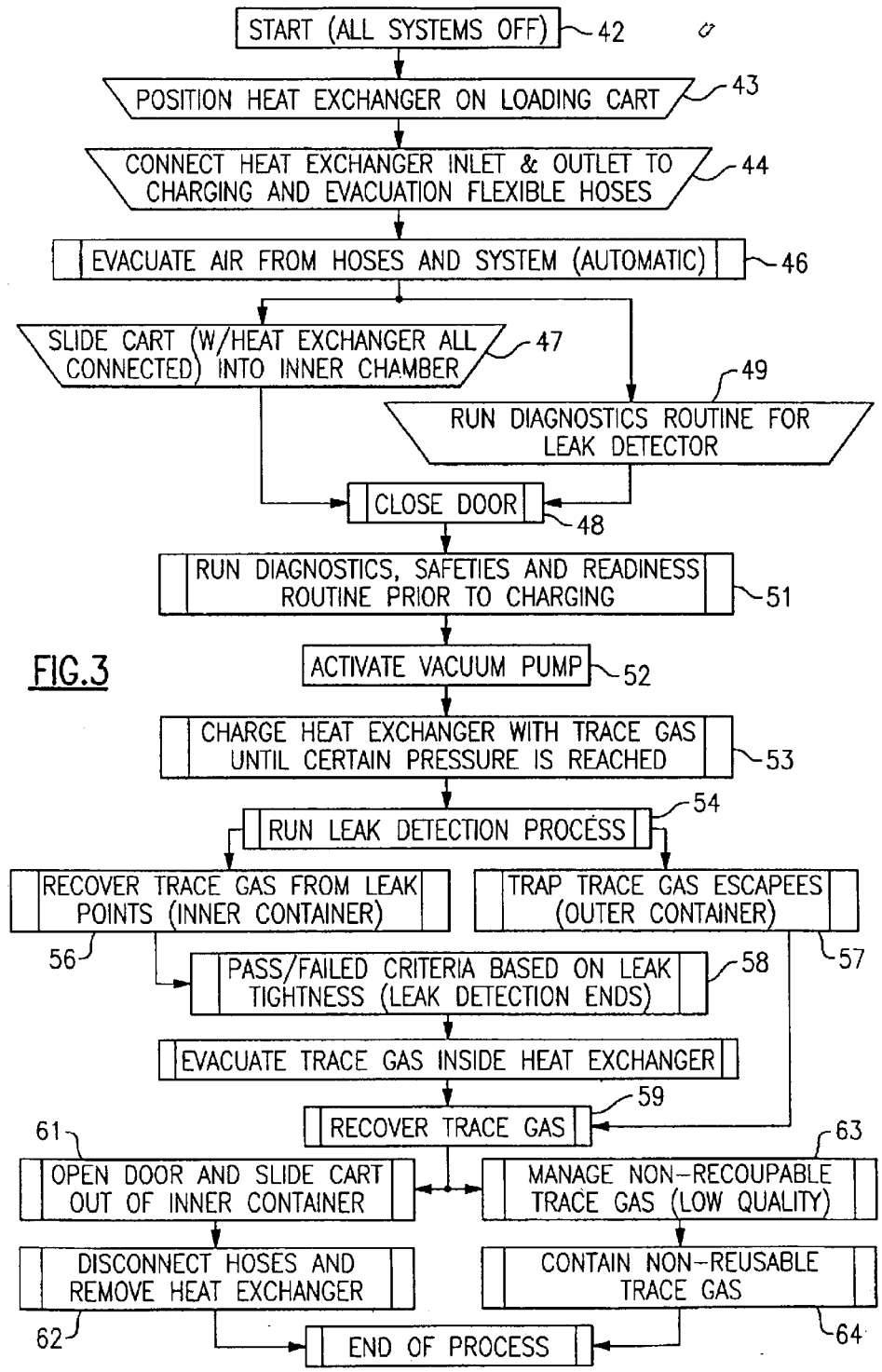
FIG. 3 is a schematic illustration of the various steps that are taken during the process in accordance with a preferred embodiment of the present invention.

Referring now to FIGS. 2 and 3, the steps in the testing process are shown in proper sequence in accordance with the present invention. It will be seen that, in order to facilitate the insertion of the coil into the testing booth 16 a hinged door 33 is provided having outer 34 and inner 36 walls defining a hermetic, leak tight double wall construction with a dead air space under vacuum 37 therebetween. Charging and return lines 38 and 39, respectively pass through the door 33 as shown.

With all systems off (block 42 of FIG. 3), the coil 11 arrives on a cart 41 (block 43) and is connected to the charging/return lines 38 and 39 to thereby evacuate any gases that are in the coil 11 (blocks 44 and 46). It is then moved into the container 16 and the door 33 is closed (blocks 47 and 48). A diagnostics routine may be run if desired (blocks 49 and 51). The vacuum pumps 21 are then activated (block 52) so as to take a vacuum on the space 22, after which the vacuum pumps are turned off. The coil 11 is then charged with a trace gas using lines 38 and 39 (block 53), and the leak detection test begins (block 54).

The actual process of leak testing is done in accordance with known procedures. That is, the detector arm and sensor may be caused to move around in close proximity to the various locations where leakage may occur. Alternatively, the sensor may remain stationary and the coil may be made to move around the sensor. A combination of these two approaches may also be used.

During and after the leak detection process within the inside container 16, any gas leakage is suctioned into the recovery station 26 by way of the gas extraction system 23 (Block 56). At the same time, any leakage gases that may pass to the space 22 are pumped by the second gas extraction system 24 into the containment tank 27 or the recovery station 26 (block 57) depending on the cleanliness thereof.

After the coil has been leak tested (block 58) the step to "Evacuate Trace Gas Inside Heat Exchanger" is taken and the trace gas recovery is performed (block 59) by suctioning the trace gas through the evacuation station 29 to the supply gas tank 31.

Then the door 33 is opened (block 61) and the coil is removed (block 62) and the next coil is passed into the inside container 16 in order to be tested.

The contaminated trace gases in the containment tank 27 are disposed of (block 63) and the reusable trace gases are passed from the recovery station 26 to the supply gas tank 31 (block 64).

While the present invention has been described with reference to a particular preferred embodiment and the accompanying drawings, it will be understood that those skilled in the art that the invention is not limited to the preferred embodiment and that various modifications and the like could be made thereto without departing from the scope of the invention as defined in the following claims.

We claim:

1. A method for detecting leaks in a heat exchanger of the type having an internal conduit through which refrigerant is intended to pass for purposes of heat transfer between the refrigerant and a medium passing externally over said heat exchanger, comprising the steps of:

providing an inner container having a leak detection sensor disposed therein;

providing an outer container surrounding said inner container with a space therebetween;

placing a coil to be leak detected into said inner container and connecting said coil to a source of trace gas;

pressurizing said coil with trace gas and using said sensor to detect leaks therein;

with apparatus separate from said sensor, collecting any leakage of the trace gas in said inner and outer containers; and wherein a trace gas recovery station is included and the method includes the additional steps of allowing trace gas from said inner container to pass to said trace gas recovery station; and passing at least some of said trace gas from said trace gas recovery station to a supply gas tank for reuse in subsequent testing.

2. A method as set forth in claim 1 and including the step of providing a plurality of extractors to transfer any leaked trace gas from said inner container to said trace gas recovery station.

3. A method as set forth in claim 1 and including the step of drawing a vacuum in said space prior to pressurizing said coil.

4. A method as set forth in claim 1 and including the step of opening and closing a door to said inner container prior to and after the step of placing said coil in said inner container.

5. A method as set forth in claim 1 and including the step of removing said coil from said inner and outer containers.

6. A method for detecting leaks in a heat exchanger of the type having an internal conduit through which refrigerant is intended to pass for purposes of heat transfer between the refrigerant and a medium passing externally over said heat exchanger, comprising the steps of:

providing an inner container having a leak detection sensor disposed therein;

providing an outer container surrounding said inner container with a space therebetween;

placing a coil to be leak detected into said inner container and connecting said coil to a source of trace gas;

pressurizing said coil with trace gas and using said sensor to detect leaks therein;

with apparatus separate from said sensor, collecting any leakage of the trace gas in said inner and outer containers; and passing a contaminated portion of said trace gas to a containment tank.

7. A method for detecting leaks in a heat exchanger of the type having an internal conduit through which refrigerant is intended to pass for purposes of heat transfer between the refrigerant and a medium passing externally over said heat exchanger, comprising the steps of:

providing an inner container having a leak detection sensor disposed therein;

providing an outer container surrounding said inner container with a space therebetween;

placing a coil to be leak detected into said inner container and connecting said coil to a source of trace gas;

pressurizing said coil with trace gas and using said sensor to detect leaks therein;

with apparatus separate from said sensor, collecting any leakage of the trace gas in said inner and outer containers;

including the steps of allowing trace gas from said outer container to pass to a trace gas recovery station; and allowing contaminated trace gas from said outer container to pass to a containment tank.

8. A system for detecting leaks in heat exchangers that are designed for the internal flow of refrigerant therein comprising:

an outer airtight booth;

an inner booth contained within said outer booth with said inner and outer booths defining a buffer space therebetween;

a leak detection sensor disposed within said inner booth and adapted to detect and indicate the presence of a particular trace gas;

means for placing a heat exchanger to be tested into said inner booth, closing said inner and outer booths, and internally pressurizing said heat exchanger with said particular trace gas so as to allow said leak detection sensor to sense any leakage from said heat exchanger;

means separate from said sensors for collecting any leaked trace gas within said inner and outer booths;

a refrigerant recovery vessel fluidly connected to said inner booth for collecting the flow of leaked trace gas from said inner booth; and recirculation means for receiving said leaked trace gas from said refrigerant recovery vessel and returning said leaked trace gas to a supply system for reuse.

9. A system as set forth in claim 8 wherein said placing means includes a door to said inner booth which may be opened and closed, respectively before and after the placement of said heat exchanger in said booths.

10. A system as set forth in claim 8 and including suction means for creating a vacuum in said outer booth.

11. A method of leak testing a heat exchanger of the type having internal flow passages for conducting the flow of refrigerant therein, comprising the steps of:

providing an outer container;

providing a leakproof container disposed within said outer container;

providing in said inner container a sensing device capable of detecting the presence of a particular trace gas;

placing the heat exchanger to be tested within said inner leakproof container with connection to a source of said particular trace gas;

pressurizing said heat exchanger from said source of particular trace gas;

using said sensing device to detect and locate the leakage of trace gas from the heat exchanger;

with apparatus separate from said sensor, collecting any leakage of the trace gas in said inner container;

providing a refrigerant recovery vessel for the collection of leaked trace gas that accumulates in said inner container; and receiving leaked gas which has accumulated in said outer container and recirculating said leaked gas for reuse in subsequent leak testing operations.

12. A method as set forth in claim 11 and including an additional step of drawing a vacuum in a space between said inner and outer containers prior to said pressurizing step.

13. A method as set forth in claim 11 and including a step of providing a plurality of extractors for facilitating the transfer of leaked trace gas from said inner container to said refrigerant recovery vessel.

14. A method as set forth in claim 11 and including a step of evacuating said heat exchanger prior to being pressurized.

15. A method as set forth in claim 11 and including the steps of respectively opening and closing a door in said inner container prior to and after the step of placing the heat exchanger within said inner container.

16. A method of leak testing a heat exchanger of the type having internal flow passages for conducting the flow of refrigerant therein, comprising the steps of:

providing an outer container;

providing a leakproof container disposed within said outer container;

providing in said inner container a sensing device capable of detecting the presence of a particular trace gas;

placing the heat exchanger to be tested within said inner leakproof container with connection to a source of said particular trace gas;

pressurizing said heat exchanger from said source of particular trace gas;

using said sensing device to detect and locate the leakage of trace gas from the heat exchanger;

with apparatus separate from said sensor, collecting any leakage of the trace gas in said inner container; and including a step wherein a portion of said collected leaking of trace gas is contaminated and further where said contaminated trace gas is collected in a containment tank.

* * * * *